(12) United States Patent
Yarden et al.

(10) Patent No.: US 6,280,397 B1
(45) Date of Patent: Aug. 28, 2001

(54) HIGH SPEED ACCURATE TEMPERATURE MEASURING DEVICE

(75) Inventors: Moshe Yarden, Mevaseret Zion; Sorin T. Teich, Savion; Ilan Vadal, Ramat Gan, all of (IL)

(73) Assignee: Medism, Ltd., Jerusalem (IL)

( * ) Notice: Subject to any disclaimer, the term of this patent is extended or adjusted under 35 U.S.C. 154(b) by 0 days.

(21) Appl. No.: 09/403,974

(22) PCT Filed: Apr. 23, 1998

(86) PCT No.: PCT/IL98/00193
§ 371 Date: Feb. 14, 2000
§ 102(e) Date: Feb. 14, 2000

(87) PCT Pub. No.: WO98/50766
PCT Pub. Date: Nov. 12, 1998

(30) Foreign Application Priority Data

May 1, 1997 (IL) .......................................... 120758

(51) Int. Cl.⁷ .................................................. A61B 10/00
(52) U.S. Cl. ................................................ 600/549
(58) Field of Search ............................. 600/549, 486, 600/537

(56) References Cited

U.S. PATENT DOCUMENTS

| | | |
|---|---|---|
| 4,183,248 | 1/1980 | West . |
| 4,411,266 * | 10/1983 | Cosman ..................... 128/303.18 |
| 4,563,098 * | 1/1986 | Bartran ........................... 374/172 |
| 4,955,380 * | 9/1990 | Edell ............................... 600/355 |
| 5,057,106 * | 10/1991 | Kasevich et al. ............... 606/33 |
| 5,255,979 * | 10/1993 | Ferrari ............................ 374/158 |
| 5,573,004 * | 11/1996 | Groenke .......................... 600/537 |
| 5,879,082 * | 3/1999 | Smitherman et al. .......... 374/110 |
| 5,957,961 * | 9/1999 | Maguire et al. ................. 607/99 |
| 6,146,015 * | 11/2000 | Weiss .............................. 374/164 |

FOREIGN PATENT DOCUMENTS

| | | |
|---|---|---|
| 21 21 189 | 11/1971 | (DE) . |
| 35 27 942 | 2/1987 | (DE) . |
| 86 18 463 | 5/1987 | (DE) . |
| 2 133 664 | 12/1972 | (FR) . |

* cited by examiner

Primary Examiner—Cary O'Connor
Assistant Examiner—Pamela L. Wingood
(74) Attorney, Agent, or Firm—Lowe Hauptman Gilman & Berner, LLP

(57) ABSTRACT

The present invention relates to a high speed accurate temperature measuring device especially useful for measuring human body temperature, comprising (a) an elongated temperature probe, (b) a first temperature sensor located beneath the surface of the probe, (c) at least one second temperature sensor located within the probe and parallel to the first sensor, (d) a thermal insulation member located between the first sensor and the second sensor (or sensors), (e) a data processing unit connected to the first and second temperature sensors calculating the body temperature according to heat flux measured between the body and the first sensor and between the first sensor and the second sensor (or sensors), and (f) a data display connected to the data processing unit.

7 Claims, 3 Drawing Sheets

HIGH SPEED ACCURATE TEMPERATURE MEASURING DEVICE

FIELD OF THE INVENTION

The present invention generally relates to a high speed accurate temperature measuring device which is especially useful for measuring the temperature of a low thermal conductivity cavity hereinafter called "body" (e.g. human body). More specifically the present invention relates to a high speed accurate temperature measuring device wherein the body temperature is calculated according to heat flux measured between the body and a first temperature sensor location and between the first temperature sensor and a second temperature sensor (or sensors) location.

BACKGROUND OF THE INVENTION

Every temperature measuring process involves the transfer of heat from the measured body to the measuring device probe. Heat may be transferred in three ways; by conduction, by convection and by radiation. The method of the present invention measures heat convection as well as heat conduction (such as in streaming air or liquids). Radiation heat meant lacks accuracy since achieving accuracy is dependent on earlier knowledge of constants that are not known with a high certainty.

Most temperature measuring devices using convection or conduction require the temperature measuring sensor to come into thermal equilibrium with the body being measure. When the body being measured is a poor heat conductor, the time to reach equilibrium (with the temperature measuring sensor) may be considerable. This measurement waiting time (to reach equilibrium) is a thermodynamic necessity. Various methods aiming at shortening this waiting time exist. For example DE 3527942 and U.S. Pat. No. 4,183,248 disclose a method comprising two temperature sensors and a heating elements. Shortening of this wait time is always at the expense of the accuracy of measurement.

The device of the present invention eliminates this waiting time. Instead of directly measuring the temperature (which requires waiting for equilibrium), the device of the present invention calculates the temperature by predicting temperature sensor measurements. This prediction relies on a heat transfer equation, and preferably a heat conduction equation whereby the body temperature is calculated according to heat flux measured (a) between the body and a first temperature sensor and (b) between the first temperature sensor and a second temperature sensor (or sensors). Since firstly the heat flux measurements do not require waiting for thermal equilibrium and secondly the calculation per se is performed in real time on a standard micro-processor, the device of the present invention can rapidly display the accurate temperature of the body.

Following is a detailed explanation of deriving the essential equations (embodied within the algorithm used by the data processing limit according to the present invention).

The Conduction Heat Transfer Equation (one dimensional without heat sources, since the heating body of the present device is not operated during the temperature measurement):

$$\rho C_P = \frac{dT}{dt} = \frac{-d}{dx}\left(k\frac{dT}{dx}\right)$$

This equation represents heat flux differences between the inlet and the outlet of the body under discussion.

$$\frac{dT}{dt} = \frac{1}{\rho C_P \Delta x} \Delta \left[k\frac{dT}{dx_{in}} - k\frac{dT}{dx_{out}}\right]$$

where one dimensional heat flux (Q) is defined as the constant "k" times the change in temperature dT with regard to a change in position dx:

$$(^*)\ Q = -k\frac{\Delta T}{\Delta X}$$

Using finite differences equation (*) can be written:

$$\frac{T(t+\Delta t) - T(t)}{\Delta t} =$$

$$\frac{1}{\rho C_P \Delta x}\left[k\frac{T(x+\Delta x) - T(x)}{\Delta x}\bigg|_{x=x_{in}} - k\frac{T(x+\Delta x) - T(x)}{\Delta x}\bigg|_{x=x_{out}}\right]$$

If:

$$\omega_{in} = \frac{k\Delta t}{\rho C_P \Delta x_{in}^2}$$

and $$\omega_{out} = \frac{k\Delta t}{\rho C_P \Delta x_{out}^2}$$

Then:

$$(^{**})T(t+\Delta t) - T(t)\big|_{x=\frac{1}{2}(x_{in}+x_{out})} =$$

$$\omega_{in}[T(x+\Delta x) - T(x)]|_{x=x_{in}} - \omega_{out}[T(x+\Delta x) - T(x)]|_{x=x_{out}}$$

If there are two heat sensors "$S_1$" which is located at $x_{in}$ and "$S_2$" which is located at $x_{out}$, and these sensors are separated by a finite distance having a known thermal conduction coefficient (e.g a thermal insulation member), and "$S_1$" is in thermal contact with the body, and "$S_2$" is within a thermal probe, and the body is located at $x_{in}+\Delta x$ then from (**) it is clearly seen that approximately:

$$T(t+\Delta t) - T(t)\big|_{x=\frac{1}{2}(x_{in}+x_{out})} = \omega_{in}[T_{body} - T_{S_1}] - \omega_{out}[T_{S_1} - T_{S_2}]$$

The temperature rise as evaluated at location $\frac{1}{2}(x_{in}+x_{out})$ is defined as heat in from the body $\omega_{in}$ times: $[(T_{body})$ minus $(T_{S_1})]$ minus $\omega_{out}$ times heat out from the probe $[(T_{S_1})$ minus $(T_{S_2})]$.

The device of the present invention solves this equation for the unknown $T_{body}$, $\omega_{in}$, $\omega_{out}$ according to measured temperatures representing the heat fluxes, without any need to wait for thermal equilibrium.

SUMMARY OF THE INVENTION

The present invention relates to a high speed accurate temperature measuring device especially useful for measuring human body temperature, comprising (a) an elongated temperate probe, (b) a first temperature sensor located beneath the surface of the probe, (c) at least one second temperature sensor located within the probe and parallel to the first sensor, (d) a thermal insulation member located between the first sensor and the second sensor (or sensors), (e) a data processing unit connected to the first and second temperature sensors calculating the body temperature according to heat flux measured between the body and the first sensor and between the first sensor and the second sensor (or sensors), and (f) a data display connected to the data processing unit.

DETAILED DESCRIPTION OF THE INVENTION

The present invention relates to a high speed accurate temperature measuring device especially useful for measuring the human body temperature. The device of the present invention is likewise useful for measuring animal body temperatures and for measuring the temperature of any low thermal conductivity cavity.

The device of the present invention is comprised of:
(a) An elongated temperature probe. This probe is for insertion into a body cavity (in the present invention, the term "body cavity" also refers to the armpit; mouth cavity and rectum). The probe has a rounded insertion tip to facilitate safe insertion into delicate body cavities.
(b) A first temperature sensor. This first sensor is located beneath the surface of the probe near the insertion tip (to facilitate minimum depth insertion).
(c) At least one second temperature sensor. This second sensor is located within the probe and parallel to the fist sensor.
(d) A thermal insulation member. This member is located between the firs sensor and the second sensor (or sensors). It should be emphasized (as will be described) that the whole structure of the sensors and insulation members is preferably rolled up.
(e) A data processing unit. This data processing unit is connected to the first and second temperature sensors. The data processing unit calculates the body temperature according to heat flux measured (i) between the body and the first sensor and (ii) between the fist sensor and the second sensor.
(f) A data display. This data display is connected to the data processing unit, and is for displaying the body temperature as calculated by the data processing unit The data display may also indicate messages (e.g. measurement error).

According to the preferred embodiment of the device of the present invention, a heating element located within the temperature probe. This heating element preheats the probe to a predetermined value, (and in measuring the human body temperature, to approximately 34 to 38° C.). When the probe is thus preheated, the time required for a high order extrapolation of the measurements performed is shorter than would be otherwise the case using a room temperature probe (see heat transfer equations described in Background section).

An optional additional second sensor (herein "third sensor") can be used by the data processing unit to improve the speed and accuracy of the temperature measurement calculation. The third sensor is located within the (temperature) probe and parallel to the first sensor. The third sensor is likewise connected to the data processing unit. The data processing unit can thereby in addition calculate the body temperature according to heat flux measured between the first sensor and the third sensor.

The preheating step is optional but important since that by limiting the range of the temperature measured, the resolution is enhanced.

Furthermore, according to the preferred embodiment of the device of the present invention, the first sensor, the second sensor (or sensors), and the heating element are photo-etched onto a single flexible substrate (printed circuit board). This substrate is then rolled or folded (so as to align the two sensors (or the three sensors) in parallel) with an insulation member placed between the sensors. When rolled up, the substrate is the insulation intermediary itself. The thus aligned sensors (with their isolation intermediary) are inserted into the elongated probe and thereby held in alignment (so as to facilitate the two (or three) required flux measurements).

The elongated probe of the device of the present invention is made of metal or any other material with high thermal conductivity. The choice of material for the elongated probe should also relate to sanitary factors of use, such as easy cleaning or sterilizing (in case of medical use).

The module comprising two (or three) sensors and a heating body has the advantage of being cheaper, much easier to manufacture, does not require manual labor in manufacturing and does not require that the sensors be tuned relatively to each other.

The present invention will be further described and clarified in detail by FIGS. 1–3 These figures are solely intended to illustrate the preferred embodiment of the invention and are not intended to limit the scope of the invention in any manner.

Figure 1:
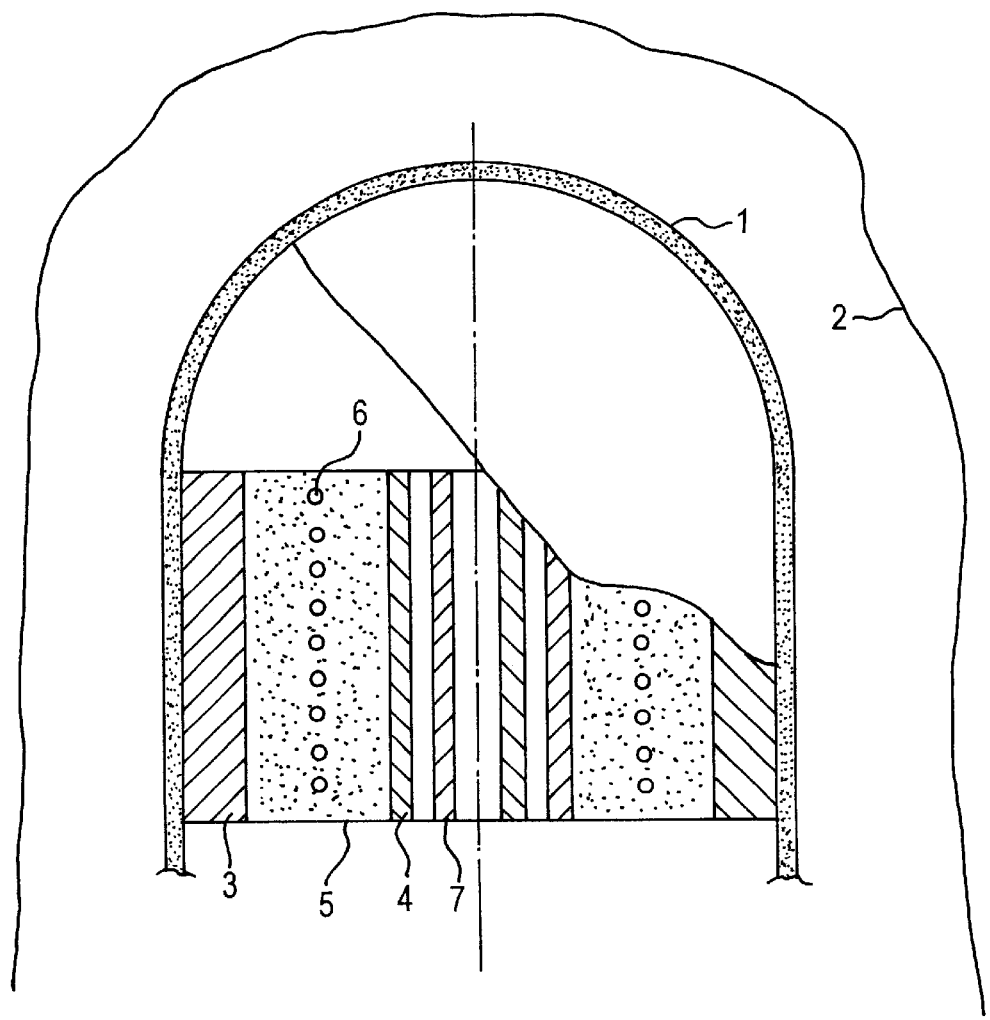
FIG. 1 illustrates a schematic cross section of an inserted probe.

FIG. 1 illustrates a schematic cross section of an inserted probe. A metal cased temperature probe (1) inserted within a cavity of the human body (2) is shown. A three part assembly is comprised of a first sensor (3) separated from a second sensor (4) by a thermal insulation member (5). This three part assembly is located near the inserted tip of the probe, wherein one side of the first sensor in thermal contact with the metal casing of the temperature probe, and with the second sensor near the axis of the probe. A heating (coil) element (6) is located within the insulation member. Furthermore the optional third sensor (7) is shown.

Figure 2:
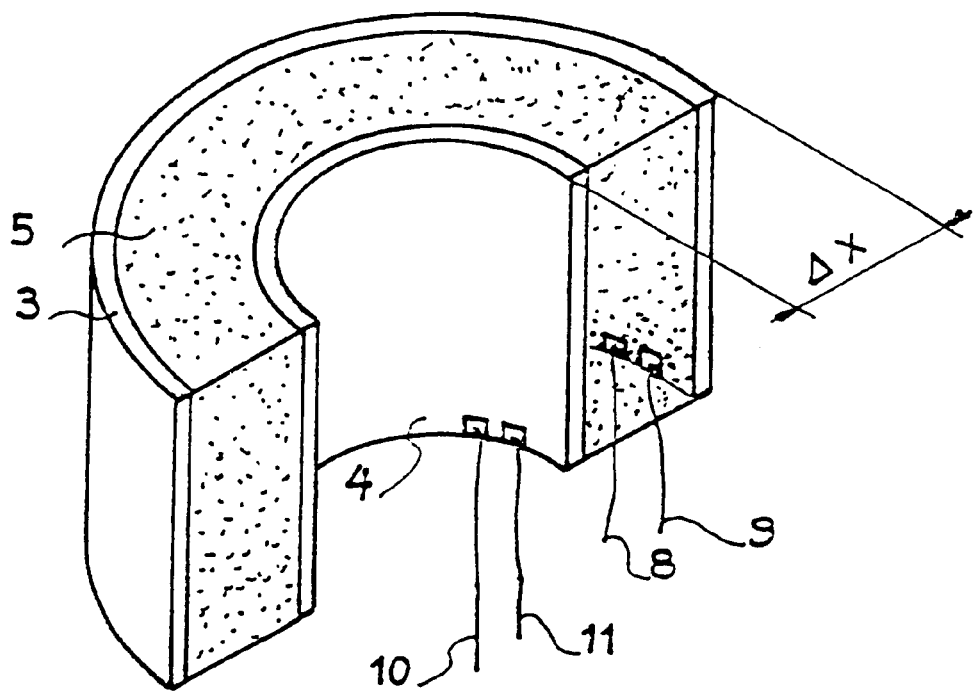
FIG. 2 illustrates an isometric cross section of the aligned sensors.

FIG. 2 illustrates an isometric cross second of the aligned sensors. A curved three part assembly (of conformal shape to the curvature of the probe in which it is to be inserted—see FIG. 1) is comprised of a fist sensor (3) (designated in the equation as "$T_{s_1}$") separated from a parallel second sensor (4) (designated in the equation as "$T_{s_2}$") by a the insulation member (5) of width "X". Thus in the equation Q=k(dT/dX) (see background section) "dT" is equivalent to $(T_{s_2}-T_{s_1})$ or to $T_{body}-T_{s_1}$ and "dX" is the final distance along the "X" axis.

The fist sensor is connected to the circuitry of the data processing unit (see FIG. 5) by electric contacts (8) and (9). The second sensor is connected to the circuitry of the data processing unit (see FIG. 5) by electric contact (10) and (11). The data processing unit (including any required analog to digital conversion circuits, a power supply (e.g. battery) is in turn connected to a data display (see FIG. 5).

Figure 3:
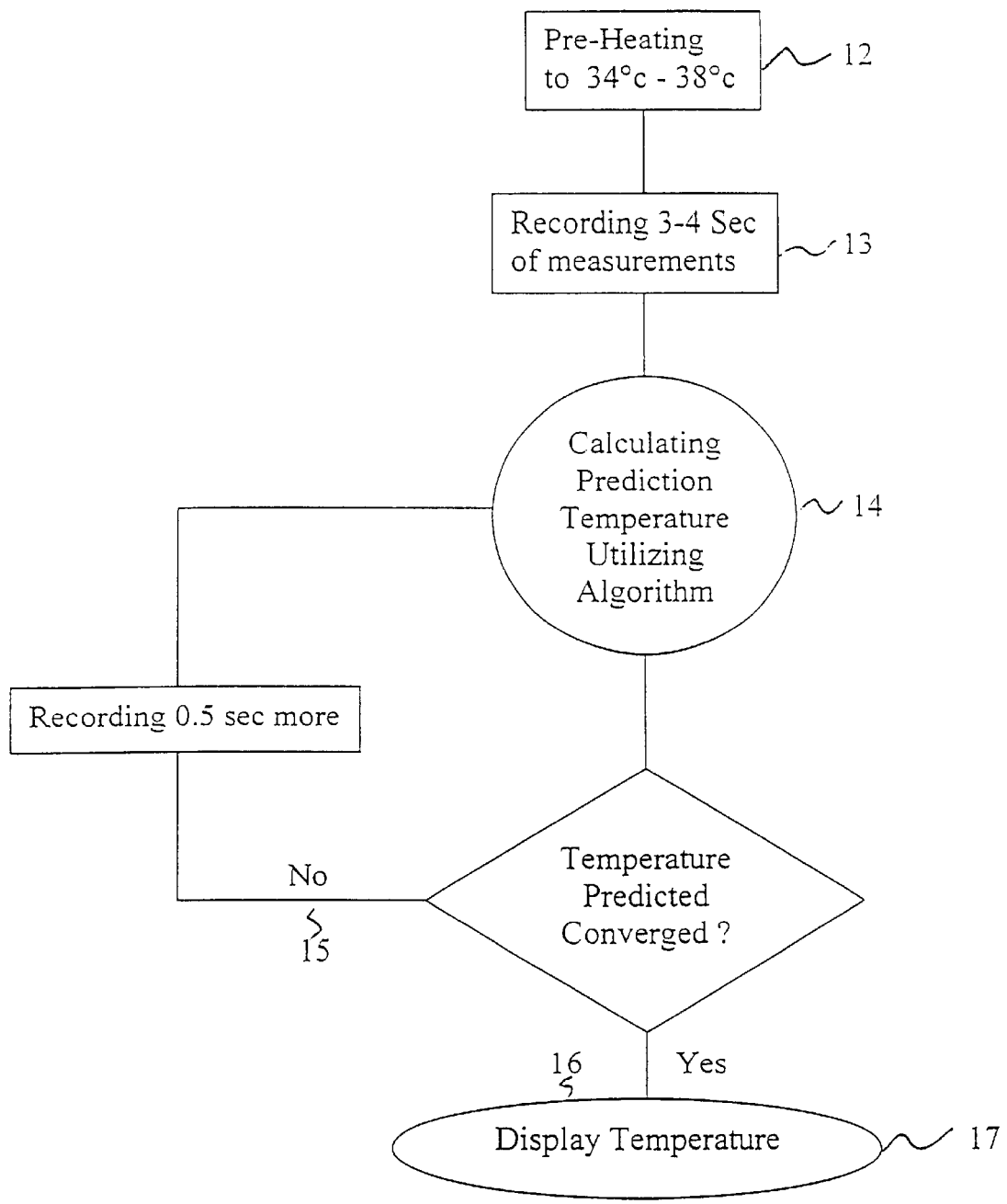
FIG. 3 is a flow chart of the operational procedures used in a high speed accurate temperature measurement device.

FIG. 3 is a flow chart of the operational procedures used in a high speed accurate temperature measurement device. After the device is activated a heating element within the probe, the heating element pre-heats the probe to approximately 34 to 38° C. (in measuring the human body temperature) data readings are taken form the two sensors for approximately 3 to 4 seconds (13), and from these measurements the data processing unit calculate (14) the body temperature converged to a constant range of ε limit.

If the calculated body temperature converged to a constant range of ϵ limit. If the calculated body temperature is not within an acceptable range for body temperatures (15), then additional temperature measurements are taken from the two sensors for approximately 0.5 seconds and the calculation step (14) is repeated. If the calculated body temperature is within an acceptable range (16), then the calculated body temperature is displayed (17) on the data display.

The device according to the present invention has an analog and a digital circuits. The analog circuit's purpose is to sample temperature and to activate the heating element. The circuit is connected to two sensors (with an option for a third sensor), a heating element and to the digital circuit in order to relay the data samples and in order to digitally process the data. Each sensor has a separate circuit. Each sensor's signal, arriving in a very low voltage (a total of 100 $\mu$V), is relayed to a noise filter. The signals are then and are relayed to the analog circuit segment's exit.

The digital circuit's purpose is to control the whole operation of pre-heating and activating the analog segment, to produce measurements, to receive amplified and filtered signals from the analog circuit segment, to convert them to binary (digital) values, to perform the required mathematical calculations and to display the calculated temperature.

A multiplexer unit accepts the analog data from the analog circuit and serially passes it to be A/D convertor that quantifies the voltages to binary (digital) values. The microprocessor calculates the temperature and also controls the circuit's running of the program. This circuits also consists of a display unit and other circuit elements that supply a stable electronic working environment for the microprocessor.

The data processing unit can now be attached to the appropriate electric contacts. Then the substrate is rolled (or folded) so as to align the two sensors in parallel having an insulation member placed between the sensors. The thus aligned sensors with their insulation member are inserted into the elongated probe and thereby held in alignment. Then the data processing unit, data display, battery and appropriate holders and connectors can be inserted into the region of the probe distant from the insertion tip, and the probe can be hermetically sealed for appropriate sanitary uses as a temperature measuring device especially useful for measuring human body temperature.

What is claimed is:

1. A high speed accurate temperature measuring device especially usefull for measuring human body temperature, comprising;

a) an elongated temperature probe with a rounded insertion tip for insertion into a body cavity;

b) a first temperature sensor located beneath the surface of the probe near the insertion tip;

c) at least one second temperature sensor located within the probe and parallel to the first sensor;

d) a thermal insulation member located between the first sensor and the second sensor, e) a digital data processing unit connected to the first and second temperature sensors;

f) a data display connected to said data processing unit;

wherein the data processing unit calculates the body temperature by using the readings from said temperature sensors and numerically solving the heat transfer equation based on the heat flux between the body and the first sensor and between the first sensor and the second sensor.

2. A device according to claim 1 having in addition a heating element located within the temperature probe, and said heating element is preheating the probe to a predetermined temperature and in measuring the human body temperature, to approximately 34 to 38° C.

3. A device according to claim 1 having a third sensor located within the probe and parallel to the first sensor, said third sensor being connected to the data processing unit, and said data processing unit in addition calculating the body temperature according to heat flux measured between the first sensor and the third sensor.

4. A device according to claim 1 wherein the first sensor, the second sensor, and the heating element are photo-etched onto a single flexible substrate.

5. A device according to claim 3 wherein the third sensor is photo-etched onto the flexible substrate having the first sensor, the second sensor, and the heating element.

6. A device according to claim 4 wherein the substrate is rolled or folded so as to align the two sensors in parallel having an insulation member placed between said sensors, and the thus aligned sensors with their insulation intermediary are inserted into the elongated probe and thereby held in alignment.

7. A device according to claim 1 wherein the elongated probe is made of metal or other similar materials good for thermal heat conduction.

\* \* \* \* \*